US007249371B2

(12) United States Patent  
Barkan et al.

(10) Patent No.: US 7,249,371 B2  
(45) Date of Patent: Jul. 24, 2007

(54) COMMUNICATIONS SYSTEM AND METHOD

(75) Inventors: Mordehay Barkan, Kfar Sirkin (IL); Nir Barkan, Kfar Sirkin (IL)

(73) Assignee: Diversinet Corp., Toronto (CA)

( * ) Notice: Subject to any disclaimer, the term of this patent is extended or adjusted under 35 U.S.C. 154(b) by 519 days.

(21) Appl. No.: 10/258,593

(22) PCT Filed: May 1, 2001

(86) PCT No.: PCT/IL01/00389

§ 371 (c)(1),  
(2), (4) Date: Feb. 10, 2003

(87) PCT Pub. No.: WO01/86852

PCT Pub. Date: Nov. 15, 2001

(65) Prior Publication Data

US 2004/0025059 A1    Feb. 5, 2004

(30) Foreign Application Priority Data

May 5, 2000    (IL) ...................................... 135992

(51) Int. Cl.
| G06F 7/04 | (2006.01) |
| G06F 7/58 | (2006.01) |
| G06F 15/16 | (2006.01) |
| G06F 17/30 | (2006.01) |
| G06K 9/00 | (2006.01) |
| H04L 9/32 | (2006.01) |

(52) U.S. Cl. ............................. 726/4; 726/21; 713/183; 709/223

(58) Field of Classification Search ...................... 726/4  
See application file for complete search history.

(56) References Cited

U.S. PATENT DOCUMENTS 5,153,919 A    10/1992    Reeds, III et al.

(Continued)

OTHER PUBLICATIONS

PCT International Search Report for International Application No. PCT/IL01/00389, mailed Dec. 14, 2001.

*Primary Examiner*—Emmanuel L. Moise  
*Assistant Examiner*—Shewaye Gelagay  
(74) *Attorney, Agent, or Firm*—Dinesh Agarwal, P.C.

(57) ABSTRACT

A method for adding a communication device in a secure communication system comprising the steps of: A. a user accesses a database in a secure way as provided in that database and according to the authorization given to the user there, wherein the connection is achieved with a user's communication device which is used at present with the database, having already being recognized in the database as a legitimate user; B. the user is recognized in the database and is given access to facilities in that database, wherein one of the available facilities performs the service of changing the communication device or adding additional devices to the listed device(s); C. the user asks for the service of changing the communication device, to add a new device to the list of legitimate users in the database; D. the database responds by sending temporary identification means for that user for the purpose of adding a new device; E. the user connects to the database using the new communication device and presents the alphanumeric string received earlier in the process, and the database recognizes the user accordingly; F. the characteristics of the new communication devices are next presented and recorded in the database; G. the database can now relate that specific user with the new communication device, after the database has recorded the characteristics of the new communication device as belonging to the known, authorized user; H. during subsequent access of the database with the new communication device, the database will recognize the device and will grant access to the database.

18 Claims, 3 Drawing Sheets

U.S. PATENT DOCUMENTS

| | | |
|---|---|---|
| 5,239,294 A | 8/1993 | Flanders et al. |
| 5,398,285 A * | 3/1995 | Borgelt et al. ................. 380/30 |
| 6,088,450 A * | 7/2000 | Davis et al. ................. 713/182 |
| 6,311,218 B1 * | 10/2001 | Jain et al. .................... 709/229 |
| 6,317,829 B1 * | 11/2001 | Van Oorschot ............. 713/155 |
| 6,463,462 B1 * | 10/2002 | Smith et al. ................. 709/206 |
| 6,687,836 B1 * | 2/2004 | Butler ........................... 726/7 |

* cited by examiner

COMMUNICATIONS SYSTEM AND METHOD

CROSS-REFERENCE TO RELATED APPLICATIONS

The present application claims priority on prior Israeli Application S.N. 135992, filed May 5, 2000, and International Application No. PCT/IL01/00389, filed May 1, 2001, and which are incorporated herein in their entirety by reference.

TECHNICAL FIELD

The present invention relates to communication systems using public encryption, and more particularly to methods for changing the communication device or adding new devices.

BACKGROUND OF THE INVENTION

A user in a secure database may find it difficult to change the communication device used for accessing the database. Thus, for example, the database may know that the user uses a specific wireline system to access the database.

Now, the same user may desire to use a cellular telephone to access the same database.

This task may be difficult to accomplish.

The wireline system may include a computer with encryption keys stored therein. In a public encryption system, the secret private key is used to encrypt and decrypt messages.

It may be difficult or impossible to remove the private key from the computer to store it in another device, since the private key is well protected in the computer. Usually the private key is made inaccessible from outside the computer, to prevent an unauthorized person from gaining access to that key.

Initially, the private key may be generated in the computer. From that moment on, the key is well guarded inside that computer, to achieve the level of security as desired. There is no point in encrypting messages, if the encryption key is compromised, thence the need to protect the key and not to allow its transfer to another device.

This very advantage happens to work against the user; when the legitimate user himself desires to transfer the private key to another computer.

To use a cellular phone, the user needs the private key that is kept inside the computer, since the database expects the same known keys to be used by the user.

Therefore, the user may find it difficult or impossible to change from a wireline telephone to a cellular telephone.

The same problem occurs if the user desires to access the secure database from another wireline system: Again, the encryption keys have to be transferred from the first computer to a second computer. For example, a user may desire to access a database both from office and from home. At present, this is a difficult or impossible task.

Thus, although a user may be authorized to access a secure database, that user may find it very difficult to access the same database using another communication device.

Now a user may buy a cellular phone or another wireless device with a digital certificate built in, or with a private key with encryption means built in. The secure database, however, does not recognize the new device as belonging to the authorized user in the system. Therefore, the authorized user will be denied access when connecting to the database with the new device.

Moreover, a user may buy a prepaid, disposable telephone or device. The user may desire to access a secure database with that telephone. He/she may find it difficult or impossible, for the reasons detailed above.

Presently available wireless communication devices include encryption means. Internet devices may include SSL means for secure communications. These systems allow secure communications. A user who has access to a secure database, however, may find it difficult to use these devices to access the database, as the database does not recognize the new secure device.

A user may decide to enter a password or to use a private key manually. This, however, may be a difficult, tedious and error-prone process. It may require typing manually a long string, for each connection to the database. A private key or certificate stored in the communication device may be a much better solution. This cannot be achieved, however, if the private key cannot be transferred from the old communication device to the new device.

A user may personally visit the database's facilities to solve the problem, however this may waste his time. The database may be located at a remote location, thus making a physical solution difficult.

Another problem in prior art is the reception of secure, encrypted E-mail messages. The computer of the receiving party may include decryption means and a secret private key. The same user may desire to also receive secure E-mail at another facility or with another computer. Again, the problem arises as of how to transfer the secret, private key from the first computer to the second.

At present, a communication device serves as identification means for their owner. That is, a secure database recognizes a specific device and accepts this as user identification. The user is known to the database by the communication device that he/she owns.

Each device may have a different identity, with a different certificate or secret encryption key built in, so a secure database may not recognize a different device.

A problem in this approach is that users tend to change their communication devices. These devices become obsolete in a short time, and new communication devices are made to replace them. This fact refers, for example, to cellular telephones and personal computers. The problem is that a user may be precluded to replace his/her telephone or computer, if that device holds a secret key that is recognized by a database, and if that key cannot be transferred to another device. Each device has a different identity, so a secure database may not recognize a different device.

It is not realistic to force customers to continue holding and using obsolete devices for the sake of secure access to a database.

A possible solution is the use of smart card, a miniature card or other insertable identification means. A user inserts a smart card into a connector, to indicate a specific identity that is recognized by a database. Each user has a different identification device. A possible problem in that approach is that it requires a special-purpose hardware including, for example, a smart card connector and its interface. There are many communication devices that do not have such capabilities.

It is an objective of the present invention to overcome the abovedetailed problems as well as other problems in communication systems.

SUMMARY OF THE INVENTION

According to the present invention, there is provided a method for transferring connection privileges from one communication device to another device, or to a plurality of such devices.

Basically, access privileges were assigned to the user personally. These privileges are contained in a communication device as means to identify the user who has been granted access rights. The problem is how to transfer the user's identity from one device to another.

The transfer procedure has to be secure, to ensure that the other communication device belongs to the same user. Otherwise, the secure communication may be compromised altogether, as an intruder receives access rights to a secure database.

According to the novel approach, it is assumed that there is a secure link between a user and a database. The user is recognized by the database and is given access thereto. The communications between user and database are kept at a suitable level of security. Therefore, the user can access the database and exchange secure messages with the database at will.

According to the novel method, a user accesses a database in a secure way as provided in that database and according to the authorization given to the user there.

The user is recognized there and is given access to facilities in that database. A novel facility in the database performs the service of changing the communication device or adding additional devices to the listed device(s). The user asks for that service, and is given an alphanumeric string for user identification.

Either a short string or a long string may be used, according to the level of security to be achieved in the system. The string may contain, for example, 5, 10 or 100 characters.

The user then connects to the database using the new communication device. The user presents the alphanumeric string received earlier in the process, and the database recognizes the user accordingly.

The characteristics of the new communication devices are next presented and recorded in the database. For example, a digital certificate may be presented. The certificate may include a user's identification and a public key.

A challenge method is performed on the public key, wherein the database sends a string encrypted with the claimed public key of that user in that device. If the user successfully decrypts the string (proof that he holds the corresponding private key) then the public key is accepted in the database.

The database can now relate that specific user with the new communication device. That is, the database records the characteristics of the new communication device as belonging to the known, authorized user.

During subsequent access of the database with the new communication device, the database will recognize the device and will grant access to the database.

The procedure may be repeated for a plurality of communication devices, so that the user may now access, in a secure way, the same database with any one of a plurality of communication devices of his/her choosing.

The user may be given a specific time period during which he/she has to connect with the new device, to enhance security.

The method does not require the transfer or disclosure of a private key, therefore it will not compromise the secret, private key used in the encryption of messages.

Another application of the invention is in re-directing secure E-mail messages.

A user may desire to receive encrypted E-mail either at the office or at home. The above method may be used to re-direct encrypted messages, while at each facility there is a different decryption key. Using the above method, the second computer may also be recognized in the system and may receive secure E-mail encrypted to its keys.

Another benefit of the above method is that the inclusion of a second computer or communication device is performed at the security level of that database. That is, all the transactions required to assign rights to the second computer are performed using certificates or encryption as dictated by the security level in that system, so no breach of security is likely to occur during the abovedetailed procedure.

Thus, the second computer or device has the same security level as the first device. There is no compromise in security or protection measures during the changeover to another computer.

The user may either use his/her true name or a pseudonym.

A simple, concise digital certificate may be used.

The certificate may contain just a public key and a pseudonym, so the actual identity of the user needs not be disclosed. This is an anonymous certificate, with an anonymous identity. Such a certificate better preserves the privacy of the user.

Even with such a minimal amount of disclosure in the certificate, the user may enjoy access to secure databases and unique privileges. Although the user's identity is not disclosed, only that specific user can answer a public key challenge, since only that user can prove that he/she knows the private key corresponding to the public key in the certificate.

The above method allows for collation of access rights to various databases for a specific user. That is, a user may have access rights to a plurality of databases. In each database, a different communication device may be used, each with a different set of public/private encryption keys. Using the disclosed method, the user may transfer his/her rights in the databases, from the various communication devices to just one preferred device. That device may then be used to access any of the secure databases which that user has access to.

Further objects, advantages and other features of the present invention will become obvious to those skilled in the art upon reading the disclosure set forth hereinafter.

DETAILED DESCRIPTION OF THE INVENTION

A preferred embodiment of the present invention will now be described by way of example and with reference to the accompanying drawings.

Figure 1:
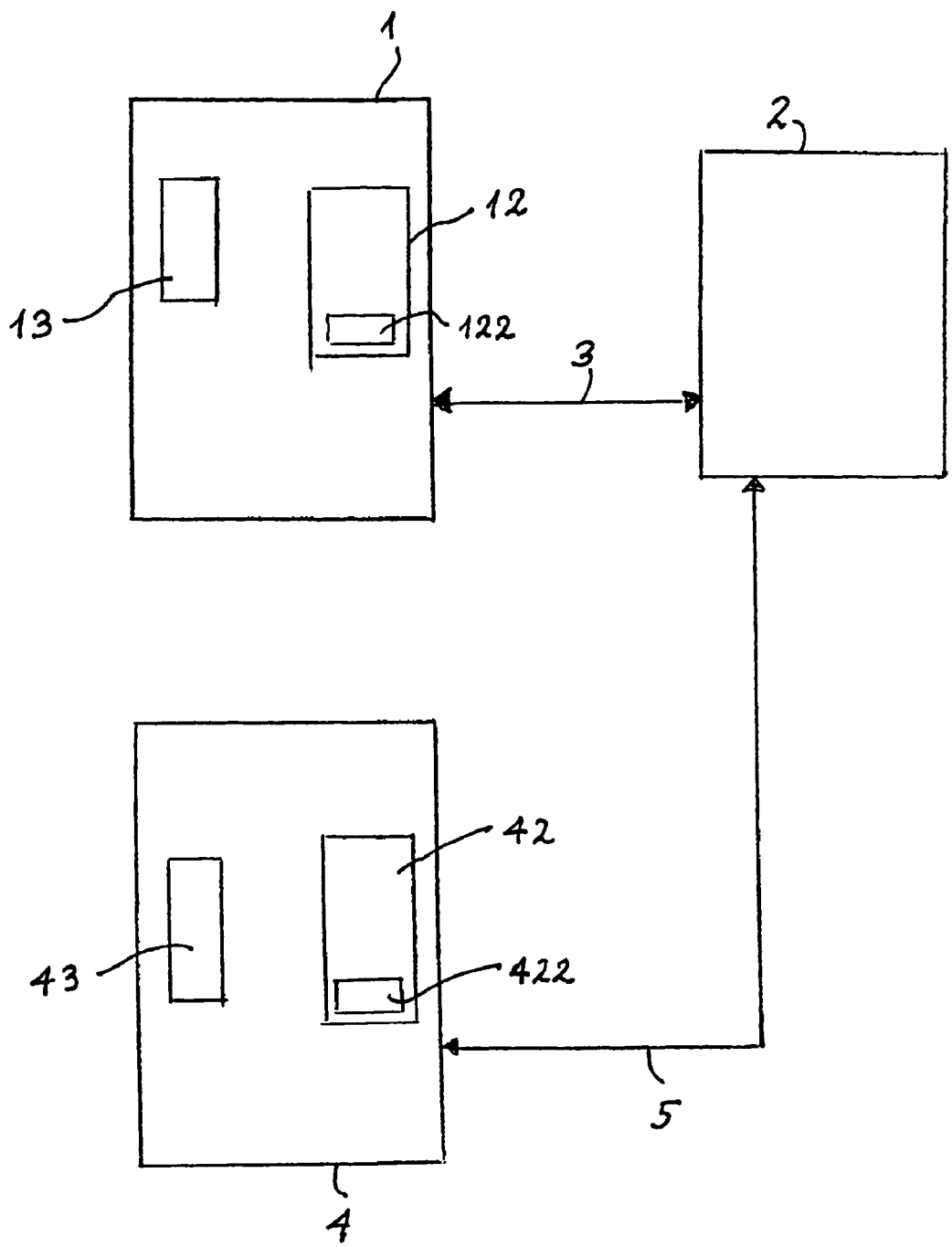
FIG. 1 illustrates a secure communication system.

Referring to FIG. 1, an embodiment of a secure communication system, a user's communication device 1, is used at present with a secure database 2.

There is a communication link 3 that connects device 1 with database 2. The link 3 may include a telephone wired net, a wireless link, the Internet or other means of digital communications.

The device 1 may include encryption means 12 with a private, secret encryption key 122 and/or a digital certificate 13.

The user may desire to also use a second communication device 4 with the database 2. The device 4 may include its encryption means 42 with a private, secret encryption key 422 and/or a digital certificate 43.

The problem is how to connect the device 4 to the database 2. Device 4 may use a different communication channel 5.

Thus, for example, the existing communication link 3 may use wireline telephone lines, whereas the communication channel 5 may be wireless. In another embodiment of the invention, the same communication means may be used for links 3 and 5.

The methods detailed below may be implemented in the above system to add the communication device 4 to the system, that is to allow the user access to the database 2 in a secure way.

Figure 2:
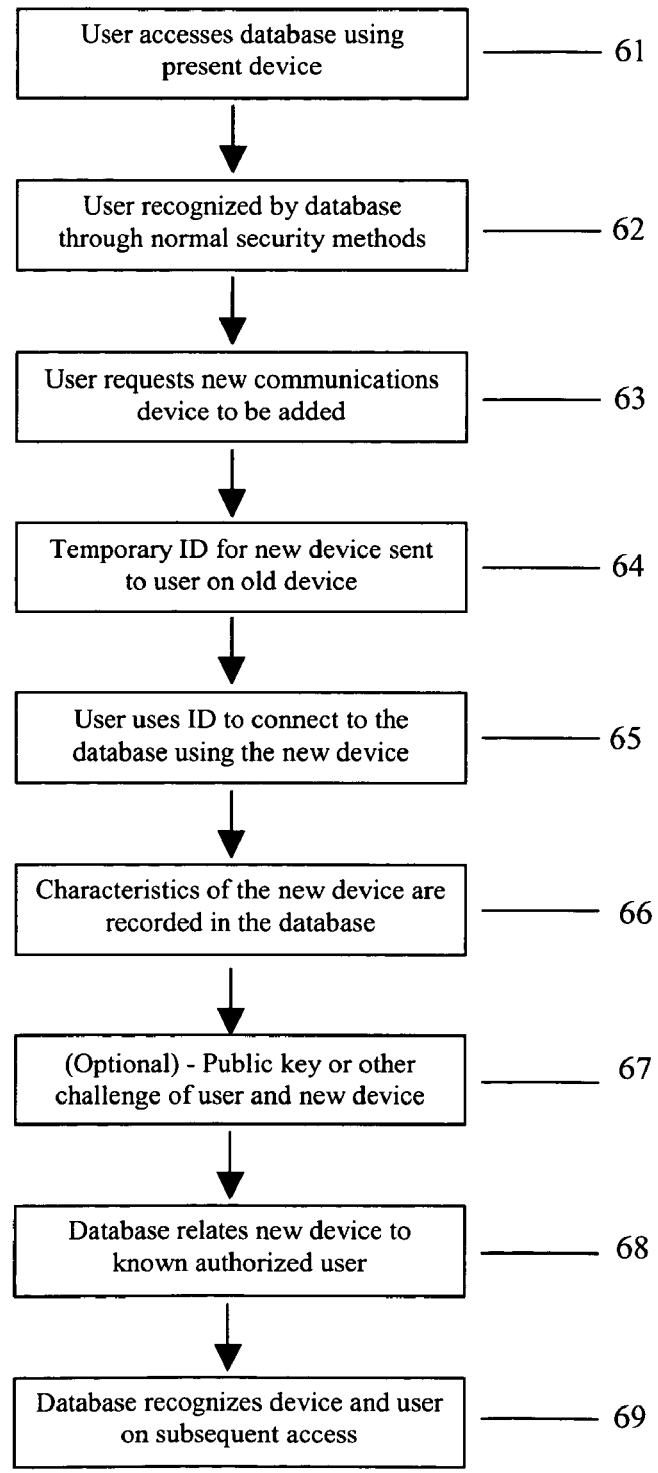
FIG. 2 details a method for adding a communication device in a secure communication system.

FIG. 2 details a method for adding a communication device in a secure communication system.

The novel approach assumes that there is a secure link between a user and a database. This implies that the user is recognized by the database and is given access to the database. Moreover, the communications between user and database are kept at a level of security that is suitable for that application.

Therefore, the user can access the database and exchange secure messages with the database at will.

A new communication device 4 is added to a secure database 2 by:

Stage 61—a user accesses the database 2 in a secure way as provided in that database and according to the authorization given to the user there. The connection is achieved with the user's communication device 1, which is used at present with the secure database 2, having already being recognized in the database 2 as a legitimate user.

Stage 62—the user is recognized there and is given access to facilities in that database 2. A novel facility in the database performs the service of changing the communication device or adding additional devices to the listed device(s).

Stage 63—the user asks for the service of changing the communication device, to add device 4 to the list of legitimate users in database 2.

Stage 64—the database responds by sending temporary identification means for that user for the purpose of adding a new device. For example, the temporary identification may be implemented with an alphanumeric string for user identification.

Either a short string or a long string may be used, according to the level of security to be achieved in the system. The string may contain, for example 5, 10 or 100 characters.

In another embodiment, the alphanumeric string may be provided by the user. As the communication link is secure, any of the parties involved may provide that string. Alternately a numeric string may be used, or an alphabetic only string may be used, as deemed necessary and suitable to that specific system.

Stage 65—the user connects to the database using the new communication device. The user presents the alphanumeric string received earlier in the process, and the database recognizes the user accordingly.

Stage 66—the characteristics of the new communication devices are next presented and recorded in the database. For example, a digital certificate may be presented. The certificate may include a user's identification and a public key.

Stage 67—(Optional) a challenge method is performed on the public key, wherein the database sends a string encrypted with the claimed public key of that user in that device. If the user successfully decrypts the string (proof that he holds the corresponding private key) then the public key is accepted in the database.

Stage 68—the database can now relate that specific user with the new communication device. That is, the database records the characteristics of the new communication device as belonging to the known, authorized user.

Stage 69—During subsequent access of the database with the new communication device, the database will recognize the device and will grant access to the database.

End of method.

For enhanced security, in stage 64 the user may be given a specific time period during which he/she has to connect with the new device (perform stage 65), otherwise the access option (the alphanumeric string sent to the user) becomes void.

An important benefit of the above method is that it does not require the transfer or disclosure of a private key, therefore it will not compromise the secret, private key used in the encryption of messages.

Figure 3:
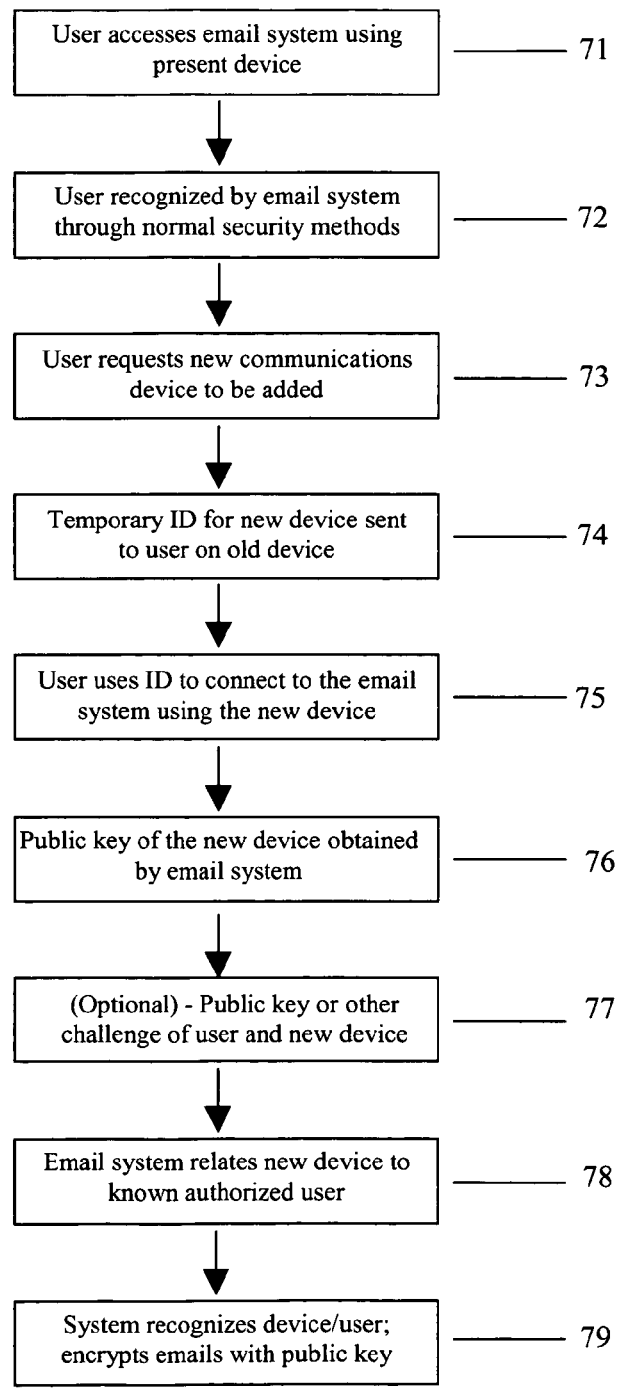
FIG. 3 details a method for adding a communication device in a secure E-mail system.

FIG. 3 details a method for adding a communication device in a secure E-mail system.

A new communication device is added to a secure database by:

Stage 71—a user accesses a database in a secure way as provided in that database and according to the authorization given to the user there.

Stage 72—the user is recognized there and is given access to facilities in that database. A novel facility in the database performs the service of changing the communication device to be used to receive E-mail or adding additional devices to the listed device(s).

Stage 73—the user asks for the service of changing the communication device.

Stage 74—the database responds by sending temporary identification means for that user for the purpose of adding a new device. For example, the temporary identification may be implemented with an alphanumeric string for user identification.

Either a short string or a long string may be used, according to the level of security to be achieved in the system. The string may contain, for example 5, 10 or 100 characters.

In another embodiment, the alphanumeric string may be provided by the user. As the communication link is secure, any of the parties involved may provide that string. Alternately a numeric string may be used, or an alphabetic only string may be used, as deemed necessary and suitable to that specific system.

Stage 75—the user accesses the database using the new communication device, for example another computer that is to receive secure E-mail. The user presents the alphanumeric string received earlier in the process, and the database recognizes the user accordingly.

Stage 76—the public key of the new computer is next presented and recorded in the database. For example, a digital certificate may be presented. The certificate may include a user's identification and the public key.

Stage 77—(Optional) a challenge method is performed on the public key, wherein the database sends a string encrypted with the claimed public key of that user in that device. If the user successfully decrypts the string (proof that he holds the corresponding private key) then the public key is accepted in the database.

Stage 78—the database can now relate that specific user with the new communication device. That is, the database records the characteristics of the new communication device as belonging to the known, authorized user.

Stage 79—During subsequent access of the database with the new communication device, the database will recognize the device and will grant access to the database. E-mail addressed to that user will be encrypted with the new public key provided in stage 76 above.

End of method.

Various other embodiments of the cover for a telephone may be implemented.

For example, the new invention may be used with various communication devices: wired or wireless. Wireless may include cellular, satellite or other means.

The user may connect to a database, a controlled access Internet site or other controlled entry facility.

It will be recognized that the foregoing is but one example of an apparatus and method within the scope of the present invention and that various modifications will occur to those skilled in the art upon reading the disclosure set forth hereinbefore.

What is claimed is:

1. A method for adding a communication device in a secure communication system comprising the steps of:
    A. a user accessing a database in a secure way as provided in that database and according to an authorization given to the user there, wherein the connection is achieved with a user's communication device which is used at present with the database, having already been recognized in the database as a legitimate user;
    B. recognizing the user in the database and giving access to facilities in that database, wherein one of the available facilities performs the service of changing the communication device or adding additional devices to a listed device(s);
    C. the user asking for the service of changing the communication device, to add a new communication device to a list of legitimate users' devices in the database;
    D. the database responding by sending temporary identification means for that user for the purpose of adding a new communication device;
    E. the user connecting to the database using the new communication device and presenting the temporary identification means received earlier in the process, and the database recognizing the user accordingly;
    F. presenting one or more characteristics of the new communication device and recording said one or more characteristics in the database;
    G. the database relating that specific user with the new communication device, after recording one or more characteristics of the new communication device as belonging to the known, said legitimate user;
    H. the database recognizing the new communication device and granting access to the database during subsequent access to the database;
    wherein in step D the user is given a specific time period during which he/she has to connect with the new communication device (perform step E), otherwise the temporary identification means becomes void.

2. The method for adding a communication device according to claim 1, wherein the temporary identification is implemented with an alphanumeric string for user identification.

3. The method for adding a communication device according to claim 1, wherein the temporary identification is implemented with a numeric string for user identification.

4. The method for adding a communication device according to claim 1, wherein the temporary identification is implemented with an alphabetic only string for user identification.

5. The method for adding a communication device according to claim 1, wherein a short string of about 5 to 10 characters is used.

6. The method for adding a communication device according to claim 1, wherein a long string of about 100 characters is used.

7. The method for adding a communication device according to claim 1, wherein in step F a digital certificate is presented.

8. The method for adding a communication device according to claim 7, wherein the certificate may include a user's identification and a public key.

9. The method for adding a communication device according to claim 1, wherein after step F a challenge method is performed on the public key, wherein the database sends a string encrypted with the claimed public key of that user in that device, and the user has to successfully decrypt it.

10. A method for adding a communication device in a secure communication system comprising the steps of:
    A. a user accessing a database in a secure way as provided in that database and according to an authorization given to the user there, wherein the connection is achieved with a user's communication device which is used at present with the database, having already been recognized in the database as a legitimate user;
    B. recognizing the user in the database and giving access to facilities in that database, wherein one of the available facilities performs the service of changing the communication device to be used to receive E-mail or adding additional devices to a listed device(s);
    C. the user asking for the service of changing the communication device, to add a new device to a list of legitimate users' devices in the database;
    D. the database responding by sending temporary identification means for that user for the purpose of adding a new communication device;
    E. the user connecting to the database using the new communication device and presenting the temporary identification means received earlier in the process, and the database recognizing the user accordingly;
    F. presenting one or more characteristics of the new communication device and recording said one or more characteristics in the database, including a public key of the new communication device;
    G. the database relating that specific user with the new communication device, after recording one or more characteristics of the new communication device as belonging to the known, said legitimate user;
    H. the database recognizing the new communication device and granting access to the database during subsequent access to the database, wherein E-mail addressed to that user will be encrypted with the public key provided in step F;

wherein in step D the user is given a specific time period during which he/she has to connect with the new communication device (perform step E), otherwise the temporary identification means becomes void.

11. The method for adding a communication device according to claim 10, wherein the temporary identification is implemented with an alphanumeric string for user identification.

12. The method for adding a communication device according to claim 10, wherein the temporary identification is implemented with a numeric string for user identification.

13. The method for adding a communication device according to claim 10, wherein the temporary identification is implemented with an alphabetic only string for user identification.

14. The method for adding a communication device according to claim 10, wherein a short string of about 5 to 10 characters is used.

15. The method for adding a communication device according to claim 10, wherein a long string of about 100 characters is used.

16. The method for adding a communication device according to claim 10, wherein in step F a digital certificate is presented.

17. The method for adding a communication device according to claim 16, wherein the certificate may include a user's identification and a public key.

18. The method for adding a communication device according to claim 10, wherein after step F a challenge method is performed on the public key, wherein the database sends a string encrypted with the claimed public key of that user in that device, and the user has to successfully decrypt it.

* * * * *